Jan. 7, 1941.   E. A. JONES ET AL   2,227,587
DUCT SYSTEM
Filed April 7, 1939   2 Sheets-Sheet 1
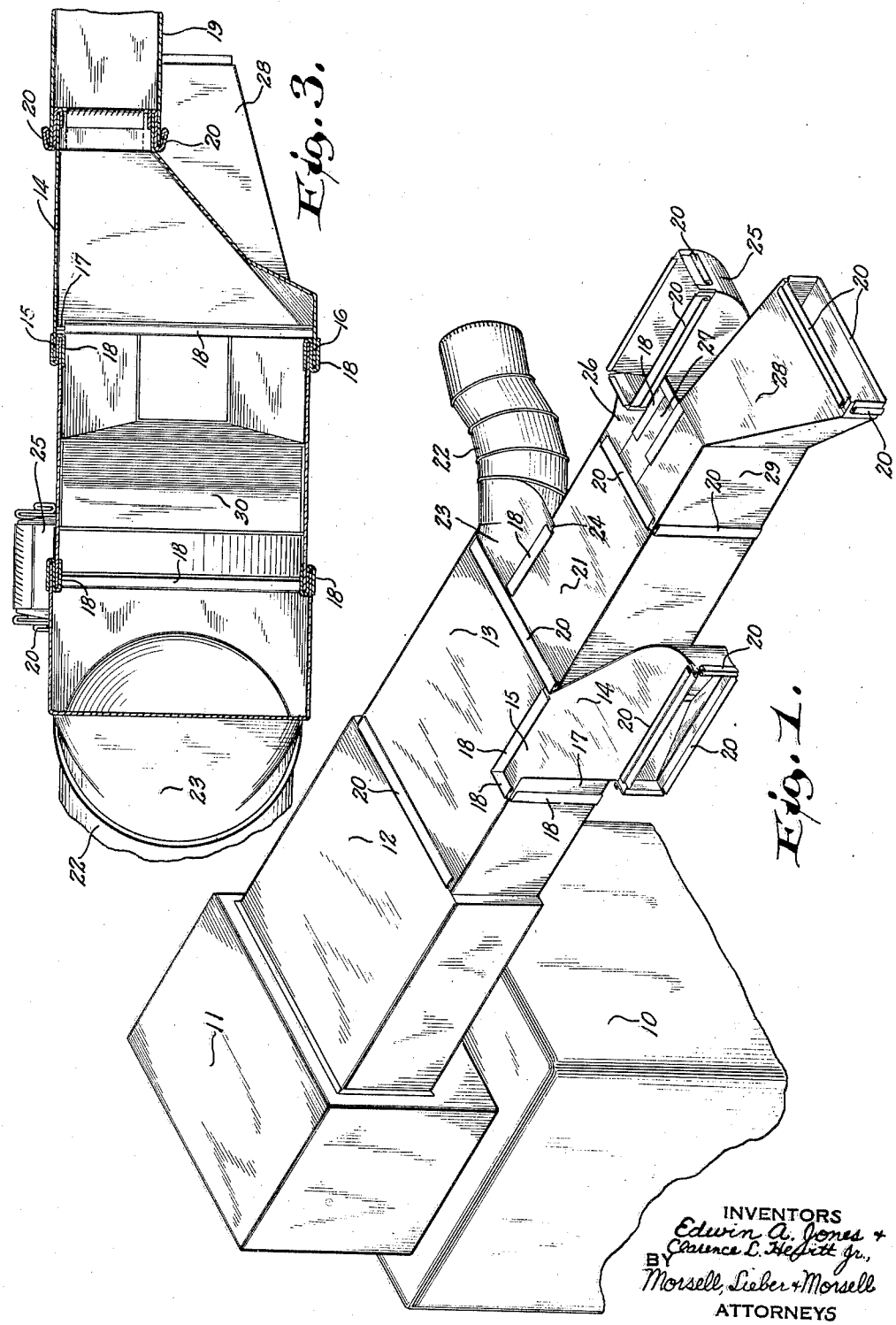
INVENTORS
Edwin A. Jones +
Clarence L. Hewitt Jr.,
BY
Morsell, Lieber & Morsell
ATTORNEYS Jan. 7, 1941.   E. A. JONES ET AL   2,227,587
DUCT SYSTEM
Filed April 7, 1939   2 Sheets—Sheet 2
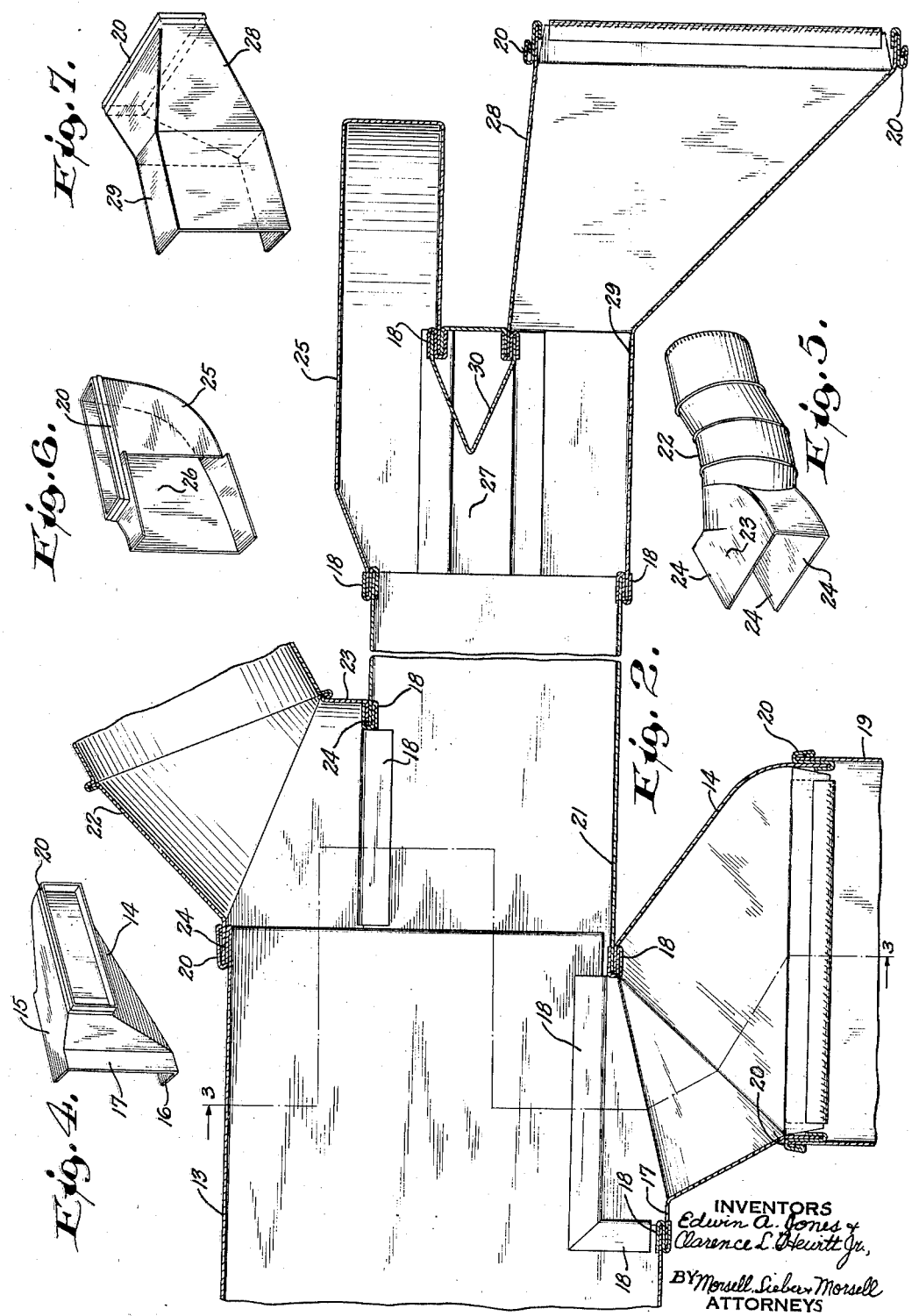
INVENTORS
Edwin A. Jones &
Clarence L. Hewitt Jr.
BY Morsell, Sieber & Morsell
ATTORNEYS

UNITED STATES PATENT OFFICE 2,227,587

DUCT SYSTEM

Edwin A. Jones, Milwaukee, Wis., and Clarence L. Hewitt, Jr., Baltimore, Md., assignors to L. J. Mueller Furnace Company, Milwaukee, Wis., a corporation of Wisconsin Application April 7, 1939, Serial No. 266,484

4 Claims. (Cl. 285—210)

This invention relates to improvements in duct work systems and the method of forming the same, and is concerned more particularly with the manufacture and installation of prefabricated fluid conduits for forced air heating and air conditioning apparatus.

In forced air heating and air conditioning apparatus the air or fluid, which has been heated or conditioned, leaves the apparatus through a main trunk line duct, and in order that portions of the fluid may be conveyed to individual rooms or compartments into which the same is discharged through registers or outlets, branch ducts are provided. These branch ducts take off from the main trunk line at various points along the same, depending on the particular requirements and the limitations imposed by the building structure. It is, of course, a fact that in order to maintain the requisite pressure and velocity within the conduit system, wherever there is a take off from the main trunk line, the cross sectional area of said main duct must, thereafter be compensatingly decreased.

The prevailing common practice in installations of the type under consideration requires that the tinsmith or installer operate as follows: The heating or air conditioning plant or apparatus proper is probably located in the basement of the building, whereas the registers or outlets are provided in the various separated rooms of the building. The installer usually works rearwardly from the register toward the heating apparatus, and leading away from a particular register, the branch duct or conduit will be of certain requisite dimensions in order to assure the delivery of sufficient quantity of conditioned fluid to the outlet. Where the branch conduit is joined to the main trunk line, particular problems arise, and it must be remembered that the tinsmith or installer has to make connections between the various branch lines or ducts and the main trunk line according to the limitations imposed by the structure, taking into consideration that certain angularity may be required and the connections may in certain instances have to avoid beams, joists, posts, partitions, etc. Accordingly, where the branch conduit is to join the main trunk line, the workman must take into consideration the various limitations above discussed and decide upon a suitable form of take off or connector. In this respect it must also be pointed out that the main trunk line, rearwardly of where a take off is effected, must have a cross sectional area sufficiently greater than the cross sectional area of the main trunk line ahead of the take off to compensate for the fluid which is passed through the branch or take off into the branch conduit. This practice is followed at all points along the main conduit where a branch take off is required, and it will therefore be appreciated that as the main conduit is installed working toward the apparatus, it necessarily must be increased in cross sectional area to compensate for the several branch take offs.

Heretofore the workman has either had to fashion special take off fittings or elbows and special reducing sections where the branch conduits are to join the main trunk line, or else utilize prefabricated duct work and fittings which have heretofore been attempted. In such cases, however, the take offs or connector elbows have been fabricated so as to have the cross sectional area equal to that of the branch extended therefrom. Bearing in mind the fact that the cross sectional area from the entrance of the main trunk line into the take off should be equal to at least the cross sectional area of the take off, it was necessary that the area of the main trunk line, rearwardly of the take off, be at least equal to that of the branch; and the elbows or take offs. Whereas the effective air carrying capacity per square inch of cross sectional area for ducts of different sizes and shapes is not uniform, but varies approximately as $$\left(\frac{\text{area}}{\text{perimeter}}\right)^{9/13}$$

it is unnecessary and undesirable for the large trunk duct to have an area as great as the total of the various branches which it supplies. In designing duct installations it is furthermore desirable to design all runs for equal friction, and therefore, the shorter branches will carry air at a higher velocity than the longer branches (friction varies as the square of the velocity). If this procedure is not followed, but the equal velocity and equal area method is employed in lieu thereof, the installation will be difficult to balance because the shorter runs will be favored. As a result, in the prior installations the main conduit toward its inner end and adjacent the apparatus became unduly bulky and large and was wasteful as to material, and the workman was extremely hampered as to where the various take offs could be installed. It is, therefore, a primary object of the present invention to provide a prefabricated duct work system and method of forming the same, for heating and air conditioning apparatus fluid conduits, wherein all of the objections noted in connection with the prior practices, are eliminated, and installation can be readily and efficiently accomplished to meet all requirements from a very limited stock of prefabricated fittings and take offs.

A further object of the invention is to provide an improved method of forming duct work systems which makes it possible, by carrying take off fittings and elbows of a relatively few limited types and styles, to form a completed duct work system of any desired character and to overcome any conditions and limitations imposed by the building structure, it being possible to mount the various take offs and elbows in any portion of the main trunk line sections, and forwardly or rearwardly of the section joints, as desired.

A further object of the invention is to provide duct work members for fluid conduits, permitting the installation of a conduit system which eliminates entrance losses at the various connections of the branches with the main trunk line.

A further object of the invention is to provide prefabricated duct work fittings adapted to connect with branch conduits and to provide for reduction and transition relative to standard main trunk line sections.

A further object of the invention is to provide, in duct work of the class described, separate take off or connector units which join with the main trunk line in a manner so that the connections are not carried to the roots of the section joints, whereby oversize main trunk sections are not required, and whereby the various take offs or connectors can be installed in the main trunk line wherever convenient.

A further object of the invention is to provide take off units for fluid duct work of a character which can be provided in a limited number of forms and sizes to meet any and all of the ordinary contingencies and requirements, and which will provide for take offs from the main trunk line at any desired position or angle and from any points there along.

A further object of the invention is to provide a duct work system wherein trunk line reducer fittings are not required.

A further object of the invention is to provide a duct work system wherein resistance throughout the entire system is minimized and may be equalized.

A further object of the invention is to provide a duct work system and method of forming the same which is simple, strong, efficient, expeditious to install, inexpensive, and well adapted for the purposes set forth.

With the above and other objects in view, the invention consists of the improved duct work system and method of forming the same, and all its parts, combinations, and steps, as set forth in the claims, and all equivalents thereof.

In the accompanying drawings in which the same reference characters indicate the same parts in all of the views:

Fig. 1 is a fragmentary perspective view of the improved duct work system connected with a heating apparatus and showing several typical take off elements connected with various sections of the main trunk line;

Fig. 2 is a horizontal longitudnal sectional view through the duct work system illustrated in Fig. 1 and on a larger scale;

Fig. 3 is a transverse vertical sectional view taken on line 3—3 of Fig. 2;

Fig. 4 is a detailed perspective view, on a smaller scale, of a rectangular side take off element;

Fig. 5 is a detailed perspective view, on a smaller scale of a universal round take off element;

Fig. 6 is a detailed perspective view on a smaller scale of a rectangular top take off element; and Fig. 7 is a detailed perspective view on a smaller scale of a rectangular and straight take off element.

Referring now more particularly to the drawings, it will appear that the numeral 10 designates a heating apparatus, or an air conditioning apparatus, or a combination of both. This apparatus is adapted to discharge heated or conditioned air under pressure into a main trunk line duct or conduit, from whence portions of the air are taken off through various branch ducts or conduits for conveyance to registers or outlets located in separated rooms of the building structure.

The outlet chamber 11 of the apparatus 10 has mounted therein one end of a section 12 of the main trunk line conduit and said section, as well as the subsequent sections, are hollow sheet metal members of rectangular cross-section. The standard depth for all of said members is eight inches, while outwardly of the apparatus, the sections of the main trunk line which carry take offs or branch fittings, are progressively decreased in width.

For the sake of illustration an intermediate main trunk section 13 is shown as having a pair of take off fittings associated therewith. The first of these fittings is a rectangular side take off element, designated generally by the numeral 14 and shown in detail in Fig. 4. This fitting is designed to afford a side connection with a branch conduit at a point forwardly of the entrance of the fitting throat into the main trunk. The throat of said fitting has upper and lower flanges 15 and 16 and a side flange 17. To receive the fitting 17 a side forward portion of the main trunk section 13, extending from its forward end rearwardly, is formed with L-shaped cut-outs in the top and bottom walls and a rectangular cut-out from the side wall therebetween, the length of said cut-outs being equal to the length of the fitting throat. The flanges 15, 16 and 17 overlap adjacent wall portions of the section 13 and are secured thereto by S-lock strips 18 forced into locking position longitudinally. The outer end peripheral portions of the fitting 14 are provided with V-shaped locking flanges 20 into which the end portions of a branch conduit 19 are secured. It will be noted, particularly from Figs. 2 and 3, that the fitting 14, as connected with the main trunk section 13, actually reduces the transverse dimension of the forward end of said section by an amount equal to the entrance to the fitting 14, and entrance into the fitting 14 is in a rectilineal path whereby resistance is minimized.

A subsequent section of the main trunk line or conduit is indicated by the numeral 21 and one side wall thereof is alined with the inner edge of the throat of the fitting 14. The edges of the section 21 which lap with end edges of the section 13 are engaged therewith by means of V-locking flanges 20, and all lapping edges of the various sections of the main trunk line are similarly secured together.

A universal round take off element is indicated by the numeral 22 and it is shown in detail in Fig. 5. Its outer end is adapted to connect with a round branch conduit in the usual manner and the fitting per se is composed of angularly related sections adjustably associated with one another to provide a desired angular direction of extent.

The throat of said fitting 22 is formed as a hood 23 having various flanged or extended edges 24 which overlap the stock of the main trunk sections with which this fitting is directly associated, being connected thereto by S-lock strips 18 and V-locks 20. The fitting 22 is adapted to connect both with the section 13 and the section 21 of the main trunk line. For this purpose the inner end of the adjacent side wall of the section 21 is cut out coextensive with one portion of the throat opening, and the right angularly disposed other opening to said throat of the fitting registers with the end portion of the inner section 13 of the main trunk line. It will be noted that the section 21 of the main trunk line is reduced in width over the rearwardly adjacent sections 13 by the transverse dimensions of the fitting throat.

A pair of typical take off fittings for the end portions of a main trunk line are illustrated in assembled positions at the right hand end of Fig. 1. The element 25, shown in Fig. 6, is a rectangular top take off having its open end surrounded by V-locks 20 for receiving the end portion of a vertical branch conduit. The throat 26 of said element 25 is open on its inner side and at its end so as to register with a portion of the end of the main trunk line section 21 and with an opening in the side of a reduced section 27. Edge portions of the stock of the throat of the element 25 are overlapped with wall portions of the sections 21 and 27 and are held thereto by locking members 20 and 18 respectively.

For the connection of a branch conduit which extends longitudinally of the main trunk line, but which is slightly offset from an end thereof, there is a rectangular straight take off element 28 shown in detail in Fig. 7. V-locks 20 in the outer end of the element 28 permit the ready attachment of a branch conduit. The element 28 is inwardly reduced and terminates in a box-like rectangular, relatively narrow throat 29 which is open at its end and inner side portions to communicate with the main trunk sections 21 and 27. Connection of the throat 29 with said sections is made in the manner described for the other elements. Within the main trunk section 27 there is a triangular baffle 30 to divide the air in the section 27 and to cause deflection of streams of air into the throats 26 and 29 of the fittings 25 and 28.

With the present invention it is contemplated that the jobber or installer carry on hand a relatively small number of prefabricated sections and fittings. For any desired duct work system for a heating or air conditioning system, a desired arrangement, according to the present invention, can be assembled and installed from a selection of prefabricated main trunk line sections, from a relatively small selection of branch duct sections and from prefabricated take off fittings.

As previously referred to, in the installation of a duct work system, the installer works rearwardly from the register outlet toward the apparatus and at points along the main trunk line, connections between branch ducts and the main trunk line must be effected, with the requirement that the main trunk line be progressively increased in cross sectional area toward the apparatus after each connection with a branch outlet fitting. With the present method and with the use of the prefabricated units adapted for assembly according to this invention, the installer is not handicapped or limited by the building structure, as the various forms of take off elements permit connection with the main trunk line at any desired convenient points and in any angular or directional relationship with the main trunk line. It is furthermore to be observed that the workman merely selects the desired take off fitting to adapt the inner end of the branch to the main trunk line, and the only operations required are those of cutting out wall portions of the main conduit sections where the take off fitting is to be installed. Attachment of the fittings and of the branch conduit sections is easily and quickly effected by means of the S-locking strips 18 and the V-locks 20. After each connection of a take off fitting the main duct line section rearwardly thereof (toward the apparatus) is only increased in width to the extent of the opening required into the take off, and all entrances to the various take offs are arranged in a rectilineal path relative to the main extent of the main trunk line and relative to the passage of air therethrough. It should be further noted that the various take off elements may be installed either behind or ahead of the joints between main trunk line sections.

The effective air carrying capacity per square inch of area for ducts of different sizes and shapes is not uniform, but varies approximately, as:

$$\left(\frac{\text{area}}{\text{perimeter}}\right)^{9/13}$$

The adaptability of the present invention may best be appreciated from the following example, wherein a trunk duct is divided as follows:

```
                                            Total sq. in. area
2— 8 x 3¼" branches,  80 cu. ft. ea, 160 cu. ft____  52
4—10 x 3¼" branches, 105 cu. ft. ea, 420 cu. ft____ 130
3—12 x 3¼" branches, 130 cu. ft. ea, 390 cu. ft____ 117
2—14 x 3¼" branches, 160 cu. ft. ea, 320 cu. ft____  91
                                     ────            ───
                                     1290            390
```

The width of a take-off fitting reduction where it joins the trunk duct will be 2 inches for each of the 8, 10, and 12 inch branches and 4 inches for each of the 14 inch branches so that the total width of the main trunk supplying all of these branches would be 26 inches. A 26" x 8" trunk line duct at equivalent pressure drop has a capacity of 1300 cubic feet, or almost exactly in balance. This same duct, however, has an area of only 208 square inches as against the 390 square inch take off required. If the usual system of equalizing areas had been followed, instead of a 26 inch duct for this system, general practice would have required a 49 inch duct at the start which would have had the approximate equivalent area of the branches connected. While the invention has been described in connection with conduits and ducts wherein fluid is conveyed from a heating or conditioning apparatus to separated discharge registers, it should be understood that systems frequently employ exhaust or return ducts or conduits wherein fluid from rooms is returned to the heating or conditioning apparatus. The present invention is equally applicable to such arrangements and all structural features are the same except that in the latter instances it should be observed that the fluid flow through the ducts and conduits is in a direction reverse to that of the fluid when the conduits and ducts are delivering conditioned fluid.

From the foregoing description it will be seen that the improved duct work system and method of forming the same is simple and effective, economic and expeditious, and well adapted for the purposes set forth.

What is claimed as the invention is:

1. In a branch take-off connection, the combination with a duct having an end and having a wall formed with an opening receding from said end, such opening having an edge formed, remotely from said end by said wall, two other edges of said opening being formed by walls substantially transverse to said wall, of a take-off duct seating on the last two mentioned edges and having a lapping relationship with portions of the walls forming such edges, separable means for connecting a wall portion of the take-off duct with the wall forming said remote edge including a tongue interiorly lapping a portion of said wall forming said remote edge, said take-off duct having an inlet end communicating with said opening of the first mentioned duct, and means securing the take-off duct to each of said seat forming walls.

2. In a branch take-off connection, the combination with a first sheet metal duct having a discharge end, a first wall of said duct terminating short of said discharge end to provide one edge of an opening, two other walls of said duct which are transverse with respect to said first wall being reduced in width at the discharge end of the duct by cutting, and cut edges of said walls forming two other edges of said opening, of a take-off duct seating on the last two mentioned edges and having a lapping relationship with portions of the walls forming said cut edges, means for connecting said lapping parts to each other, and means for connecting another wall of the take-off duct to the edge of the first mentioned wall of the first duct.

3. In a branch take-off connection, the combination with a first sheet metal duct having a discharge end, a first wall of said duct terminating short of said discharge end to provide one edge of an opening, two other walls of said duct which are transverse with respect to said first wall being reduced in width at the discharge end of the duct by L-shaped cuts extending toward the inlet end and then toward the first wall to meet the edge of said wall which terminates short of the discharge end of the duct, said cut edges of said walls forming other edges of said opening, of a take-off duct seating on the last mentioned edges and having a lapping relationship with portions of the walls forming said cut edges, means for connecting said lapping parts to each other, and means for connecting another wall of the take-off duct to the edge of the first mentioned wall of the first duct.

4. In a branch take-off connection, the combination with a first sheet metal duct having an end, a first wall of said duct terminating short of said end to provide one edge of an opening, two other walls of said duct which are transverse with respect to the first wall being reduced in width at the said end of the duct by L-shaped cuts extending away from said end and then toward the first wall to meet the edge of said first wall which terminates short of said end of the duct, said cut edges of said walls forming other edges of said opening, of a take-off duct seating on the last mentioned edges and having a lapping relationship with portions of the walls forming said cut edges, means for connecting said lapping parts to each other, and means for connecting another wall of the take-off duct to the edge of the first mentioned wall of the first duct.

EDWIN A. JONES.
CLARENCE L. HEWITT, Jr.